Dec. 7, 1965 W. A. BIERMANN 3,221,768
CONTROL DEVICE
Filed Feb. 23, 1962

INVENTOR.
William A. Biermann
BY
Bayard P. Michael
Attorney

United States Patent Office 3,221,768
Patented Dec. 7, 1965

3,221,768
CONTROL DEVICE
William A. Biermann, Brookfield, Wis., assignor to Controls Company of America, Schiller Park, Ill., a corporation of Delaware
Filed Feb. 23, 1962, Ser. No. 174,978
7 Claims. (Cl. 137—539)

This invention relates to a constant level oil control device of the type interposed between a reservoir and a burner. In such a device the liquid fuel flows by gravity and under the regulation of a metering valve. This invention relates particularly to an improvement in the metering valve of such control devices.

The better metering valves presently used in control devices of the type contemplated herein use a stepped type valve guide and a tapered type valve to insure positive shut-off of fuel flow as well as accurate control of the flow rate when changing the position of the valve stem with respect to the guide. This type of metering valve, whether of the upflow or downflow type, is subject to air binding due to the accumulation of air bubbles in the corners of the stepped portion of the valve guide. These bubbles initially restrict the fuel flow path and adversely affect the flow rate of fuel through the valve.

The primary object of this invention is to overcome this problem in metering valves of this type.

Another object of this invention is therefore to provide a metering valve which will operate satisfactorily with fuels made from crude oils.

These objects are accomplished by providing a tapered section in the guide which, in combination with a tapered section on the valve, forms a conical flow path for the fuel in which it is impossible for air to accumulate. The space between the upper portion of the valve and the valve guide is increased slightly to allow any air tending to accumulate between the two to flow freely upward in this space. In making these changes in the valve guide, it was found that the flow rate in either an upflow type or a downflow type metering valve for the same size metering slot in the valve as previously used varied in accordance with axial length of the tapered section. This relation is not particularly significant in the United States where the maximum flow rates are high enough to warrant the use of relatively large size metering slots. In Europe and other countries the maximum flow rate requirements are much lower and smaller sized metering slots are used. Fuels used in Europe are made from crude oils of types which contain relatively large amounts of wax and tar. The wax and tar in these fuels can not readily pass through the smaller metering slots used in Europe and clog up the metering valve. A metering valve having a large metering slot and providing low maximum flow rates is particularly advantageous in areas such as Europe where fuels made from such crude oils are used.

Other objects and advantages will be pointed out in or be apparent from the specification and claims, as will obvious modifications of the one embodiment shown in the drawings in which:

Figure 1:
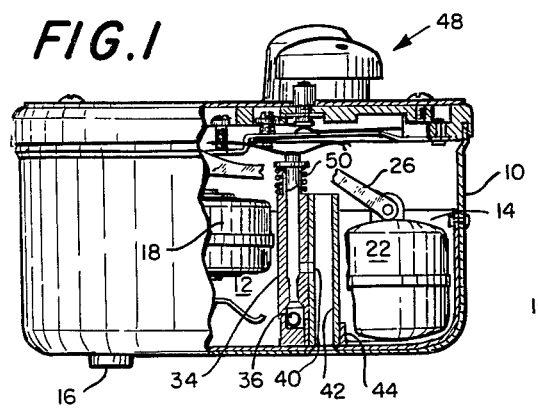
FIG. 1 is a side view partly broken away of an upflow type flow control device.

Referring to the drawings, it will be seen that an oil control device embodying the present invention includes a casing 10 having a main liquid supply chamber 12 and an overflow chamber 14. Liquid fuel is supplied through an inlet 16 and controlled by a main float type assembly 18 to maintain a constant level of oil in the supply chamber. A safety shut-off float 22 in chamber 14 is connected to lever arm 26 and rises if chamber 14 fills with fuel to override the main float assembly and close off the inlet.

An upflow type control device is shown in FIG. 1 in which fuel from supply chamber 12 flows into guide passage 32 in valve guide 34 through orifice 36 and upward into main passage 38. An orifice 40 connects the main passage with cylindrical outlet 42 which is pressure fitted or suitably secured to outlet passage 44. The rate of fuel flow through the valve guide is controlled by a cylindrical hollow valve 46 which is manually or automatically positioned in the guide by the control shown generally at 48 against the bias of spring 50. A metering slot 52 is provided in the wall of the valve and the flow rate depends on the position of the slot with respect to the upper edge 54 of the guide passage.

Figure 2:
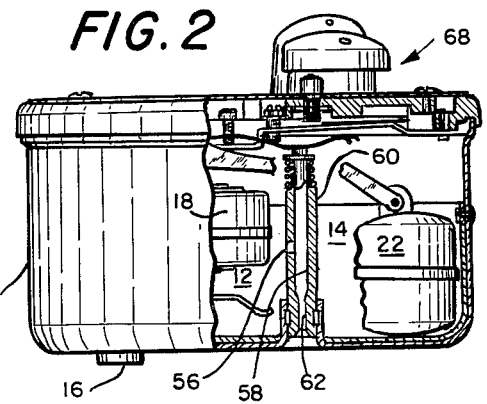
FIG. 2 is a side view partly broken away of a downflow type control device.

A downflow type control device is shown in FIG. 2 in which fuel from the supply chamber 12 flows through orifice 56 into main passage 58 in valve guide 60 and downward through outlet pasage 62. Hollow valve 64 is slidably positioned in the valve guide and is biased by spring 66 against a manual or automatic control shown generally at 68. The flow rate through the outlet passage will depend on the position of metering slot 70 with respect to the upper edge 72 of the outlet passage.

Figure 6:
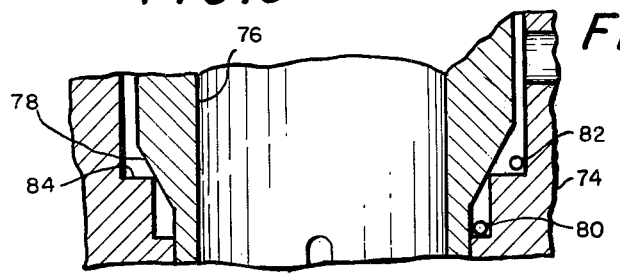
FIG. 6 is an enlarged view of the valve seat with the stepped metering section.

To better understand the problem of air binding an enlarged cross section of a stepped type valve guide 74 is shown in FIG. 6 with hollow valve 76 in the closed position. When the valve is initially raised in the valve guide, fuel will flow along tapered section 78 of the valve. Bubbles shown at 80 and 82 will accumulate in the corners of the stepped portion of the guide. These bubbles generally form when the valve stem is first lifted off the valve seat 84. A capillary path is formed between the tapered portion of the metering stem and the corners of the steps in the guide. These bubbles will form in either the upflow or downflow embodiments. It should be obvious that the bubble will reduce the size of the flow path and will adversely affect the flow rates of the metering valve.

Figures 3, 4, 5:
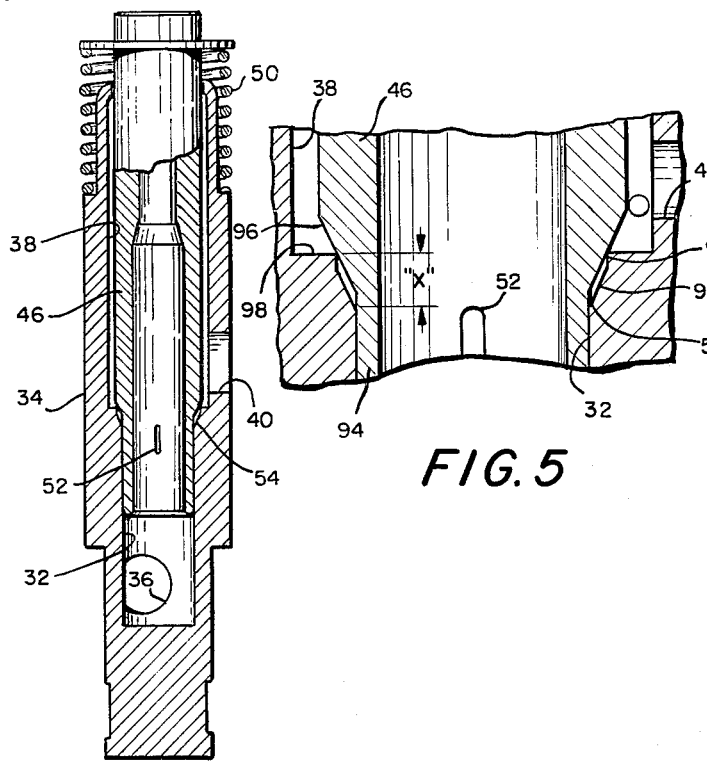
FIG. 3 is a sectional view of an upflow metering valve.
FIG. 4 is a sectional view of a downflow metering valve.
FIG. 5 is an enlarged view of the valve seat with the tapered metering section.

In FIG. 5 an enlarged cross section of the improved valve guide is shown having a guide passage 32, a main passage 38 and an outlet 40. Hollow valve 46 is slidably mounted in the guide with reduced diameter section 94 positioned in the guide passage. A tapered section 96 is provided on the valve and seats on valve seat 98 closing off fuel flow. In order to eliminate the accumulation of bubbles between the valve seat and the main passage of the housing, the outer diameter of the valve has been reduced to allow a greater space between the outside of the valve and the inside diameter of the main passage. This space should be sufficient to allow the bubble to rise freely in the main passage. In an upfeed type metering valve this bubble does not present as much of a problem as in a downflow type metering valve since the natural tendency of the bubble is to rise in the same direction as the flow of fuel. In downflow the flow of the fuel has a tendency to hold air bubbles in these corners for a longer period of time.

To eliminate the accumulation of bubbles in the corner between the valve seat and the upper edge of the guide passage a tapered section 95 is provided between the valve seat and the upper edge 54 of the guide passage. A small cylindrical passage 93 may be cut at the upper end of the tapered section to provide a valve seat for the tapered section of the valve if the two sections are made substantially parallel. In selecting the depth "$x$" (FIG. 5) of this taper, it was found that the flow rate decreased as this depth increased for the same size metering slot, all other variables such as stem rise, head, viscosity, and diameters of the passages being the same.

As an example, a .040 inch punch slot in a metering stem will provide a maximum flow rate of 40–45 cc./min. with .150 inch of stem rise, the upper edge of the slot being initially aligned with the upper edge of the guide passage. Using the same metering stem in a valve guide having a tapered section, the maximum flow rate will vary from 15 to 35 cc./min. with a distance "$x$" equal to .150 to .075 inch for a stem rise of .150 inch.

With this arrangement it is possible to provide a metering valve having a low maximum fuel flow rate for use with fuels containing relatively large amounts of wax and tar. In operation, the metering valve will provide the same result in both upflow and downflow operation but the downflow type metering valve has a tendency to accumulate wax and tar in the space between the hollow valve and the main of the guide.

Although but one embodiment of the present invention has been illustrated and described, it will be apparent to those skilled in the art that various changes and modifications may be made therein without departing from the spirit of the invention or from the scope of the appended claims.

I claim:

1. An upfeed metering valve for a constant level flow control device comprising,
   a housing having an inlet and an outlet,
   a passage in the housing connecting the inlet to the outlet,
   a hollow valve stem slidably mounted in the passage,
   said valve stem including a metering slot cooperating with the passage to control the flow of fuel from the inlet to the outlet and including an outwardly divergent section located above the metering slot,
   and a conical section in the passage cooperating with the outwardly divergent section to form a restricted flow path adjacent said slot as the valve is opened and to limit the maximum flow rate of the metering valve to a value below the rated value of the metering slot for a predetermined amount of stem rise.

2. An upfeed metering valve for a constant level flow control device comprising,
   a housing having an inlet and an outlet,
   first and second passages being in communication with the inlet and the outlet,
   a first tapered section connecting the first passage to the second passage,
   a hollow valve stem slidably positioned in the first and second passages,
   said stem having a second tapered section and a metering slot which controls the flow of fuel from the inlet to the path formed between the first tapered section and the second tapered section, said tapered sections cooperating to form a flow path adjacent and oblique to said slot as the valve is opened and to limit the maximum flow rate to a value less than the rated value of the slot and valve seat means provided in said housing and operable to engage said second tapered section to close the valve.

3. A metering device comprising;
   a valve guide including a guide section,
   a hollow valve guided in said section and having a metering slot cooperating with said guide section to meter flow in accordance with the degree of exposure of said slot beyond said guide section, said valve and valve guide having tapered portions defining a conical fluid passage adjacent said metering slot as said metering slot is exposed beyond said guide section, said valve and valve guide being adapted to sealingly engage each other when said metering slot is not exposed beyond said guide section.

4. A metering device according to claim 3 wherein said guide has a valve seat axially spaced from said guide section.

5. A metering device comprising;
   a valve guide having a guide section and a tapered section adjacent to said guide section,
   a hollow valve guided in said guide section and having a metering slot cooperating with said guide section to meter flow in accordance with the degree of exposure of said slot beyond said guide section, said valve having a tapered section which in cooperation with said tapered section of said guide section defines a restricted fluid path.

6. A metering device according to claim 5 wherein said valve guide has a valve seat and wherein its said tapered section is located between said guide section and said seat.

7. A metering valve according to claim 6 wherein said seat engages said tapered section of said valve.

References Cited by the Examiner
UNITED STATES PATENTS

| | | | |
|---|---|---|---|
| 2,117,182 | 5/1938 | Lewis | 137—625.3 |
| 2,355,870 | 8/1944 | Johnson | 251—121 X |
| 2,672,883 | 3/1954 | Dillman | 251—205 X |
| 3,110,320 | 11/1963 | Rosenberger | 251—123 X |

FOREIGN PATENTS

| | | |
|---|---|---|
| 266,962 | 5/1950 | Switzerland. |

M. CARY NELSON, *Primary Examiner.*

ISADOR WEIL, *Examiner.*